United States Patent [19]

Beccaris

[11] 4,304,322

[45] Dec. 8, 1981

[54] COMPENSATING DEVICE FOR A TRANSMISSION LINKAGE

[75] Inventor: Carlo Beccaris, Santena, Italy

[73] Assignee: Societe Anonyme Francaise du Ferodo, Paris, France

[21] Appl. No.: 20,171

[22] Filed: Mar. 13, 1979

[30] Foreign Application Priority Data

Mar. 17, 1978 [FR] France .................................. 78 07735

[51] Int. Cl.³ ........................ F16D 11/08; F16D 13/60
[52] U.S. Cl. ............................. 192/111 A; 188/196 B
[58] Field of Search ............ 192/111 A, 111 R, 70.25; 188/79.5 GT, 196 B, 200

[56] References Cited

U.S. PATENT DOCUMENTS

| | | | |
|---|---|---|---|
| 2,861,657 | 11/1958 | Curtis et al. ............ | 188/79.5 GT X |
| 3,200,912 | 8/1965 | Bouvat-Martin ................ | 188/196 B |
| 3,789,967 | 2/1974 | Dau et al. ....................... | 192/111 A |
| 4,057,135 | 11/1977 | Mori ................................ | 192/111 A |
| 4,159,754 | 7/1979 | Airheart et al. ............ | 192/111 A X |

FOREIGN PATENT DOCUMENTS

| | | | |
|---|---|---|---|
| 739701 | 10/1943 | Fed. Rep. of Germany ...... | 188/200 PL |
| 2205146 | 5/1974 | France . | |
| 46-24921 | 7/1971 | Japan ............................. | 192/111 A |
| 577339 | 5/1946 | United Kingdom . | |

Primary Examiner—C. J. Husar
Assistant Examiner—Moshe I. Cohen
Attorney, Agent, or Firm—Charles E. Brown

[57] ABSTRACT

The invention comprises a wear-compensating device for incorporation in a control linkage used for operating a motor vehicle clutch. The control linkage is arranged between the declutching fork and the clutch pedal and the device comprises two coupling parts, each of which is linked respectively to two successive sections of the linkage.

According to the invention, the outermost coupling part carries a sleeve divided into jaws so that it can pass elastically from a free configuration of disengagement, at which the jaws are at a distance from the innermost coupling part, to an enforced configuration of engagement, at which the jaws are clamped to the latter.

The device compensates for wear of the clutch friction surfaces by changing the effective length of the control linkage.

18 Claims, 8 Drawing Figures

COMPENSATING DEVICE FOR A TRANSMISSION LINKAGE

BACKGROUND OF THE INVENTION

The present invention relates generally to linkages for connecting a control member to a controlled member.

More particularly, but not exclusively, it relates to an arrangement in which this controlled member consists of a clutch release bearing, i.e. the part usually used for exercising a disengaging function on a clutch, and particularly a motor vehicle clutch, in response to the depressing of the clutch pedal by the driver, the said pedal forming the corresponding control member and being linked to the said release bearing by an appropriate control linkage.

In practice, this control linkage is established between the control pedal and a declutching fork which displaces the release bearing.

In order to reduce the travel of the release bearing in such a way that on contact of the release bearing with the disconnecting means used for disengaging the clutch all noise and wear is prevented from arising, it is customary to subject the declutching fork to elastic means which act on it in a direction in which the release bearing controlled by it is always held applied against the disconnecting means.

Now, as is well known, the friction linings of the clutch disk are inevitably subject to a certain amount of wear during operation which results in an attendant displacement of the disconnecting means and of the release bearing held in contact with these disconnecting means.

If this is not taken into account, and if the length of the control linkage attaching the declutching fork to the control pedal remains constant, the wear of the friction disk results either in a change in the rest position of the control pedal, where this is not determined by a fixed stop, or where a fixed stop is provided, in the untimely appearance of play causing slippage of the friction disk.

In addition, in the case where the control linkage includes a cable, the stretching which such a cable can undergo in service can also lead to opertional problems in the assembly.

In order to reduce these disadvantages it has been proposed to interpose into the control linkage attaching the declutching fork to the control pedal a compensating device to adjust the length of this linkage automatically, and particularly in proportion to the wear of the friction linings.

Such a compensating device is described, for example, in British Patent No. 577,339.

It comprises, on the one hand, two coupling parts which are mounted to move axially telescopically with respect to each other and which are each respectively adapted to be linked in movement to two successive sections of the control linkage concerned and, on the other hand, disconnectable locking means for locking temporarily between them the said coupling parts in an axial direction of movement only.

In this British Patent No. 577,339, however, the disconnectable locking means used consist of balls which are wedged between a cylindrical portion belonging to one of the coupling parts, and a truncated cone portion belonging to the other coupling part.

In practice, therefore, the assembly has to be relatively complex, because there is a requirement for precise surface treatment and processing of the parts, and even then, because of the frictional forces involved and the possibility of marking the portions by the balls working in conjunction with them, correct operation is not assured.

In addition, this arrangement is difficult to implement on already existing installations.

The present invention relates generally to a compensating device for a control linkage of the kind referred to which does not have the disadvantages briefly described above, and which offers other advantages.

SUMMARY

The compensating device for a transmission linkage according to the invention is characterised in that the disconnectable locking means used for linking temporarily the two coupling pieces to one another, are comprised of a sleeve which is of one part with the outermost coupling part, around the innermost coupling part, and divided by longitudinals slits into at least two jaws, said jaws being elastically deformable between a free disengagement configuration at which they are at a distance to the innermost coupling part which is thus parted from the outermost coupling part, and an enforced engagement configuration at which they are gripping the said innermost coupling part which is thus united with the outermost coupling part, and the said sleeve presenting on its outside a truncated conical portion designed to work in conjunction with a fixed truncated conical portion so that the said jaws can pass from their free disengagement configuration to their engagement configuration when the outermost coupling part is displaced axially, for example, by traction under the influence of the control pedal.

Such a compensating device is advantageously simple to implement, safe and reliable.

In addition, it is advantageously radially compact. Finally, it can be mounted advantageously on existing control linkages: it is only necessary to divide the linkage into two sections and to attach to these its constituent coupling parts.

For the compensation of play due to wear it has, of course, already been suggested to use compensating devices comprised of a sleeve divided by longitudinal slits into elastically deformable gripping jaws.

This is the case, for example, in French Patent No. 2,205,146, relating to a brake.

However, according to the present invention, such a sleeve divided into gripping jaws is used in a control linkage.

Besides, in the above mentioned French Patent No. 2,205,146 the sleeve divided into gripping jaws is only subject to a reduced axial displacement which is just enough for the said jaws to grip the part surrounded by them, this sleeve coming rapidly to rest axially against the part having the truncated conical portion with which it works together, this being adequate in the case of a brake.

According to the invention, the sleeve divided into gripping jaws is free to be displaced axially even after the jaws have gripped the coupling part surrounded by them, which is the reason permitting the sleeve to be adapted to a transmission linkage in which a relatively great axial displacement could be required.

To this end the outside of the said sleeve has a guiding part which, for its enforced engagement configuration, has a diameter which is at the most equal to that of a fixed cylindrical portion surrounding the said sleeve and in which it can thus slide axially.

DESCRIPTION OF THE PREFERRED EMBODIMENTS

Figure 1:
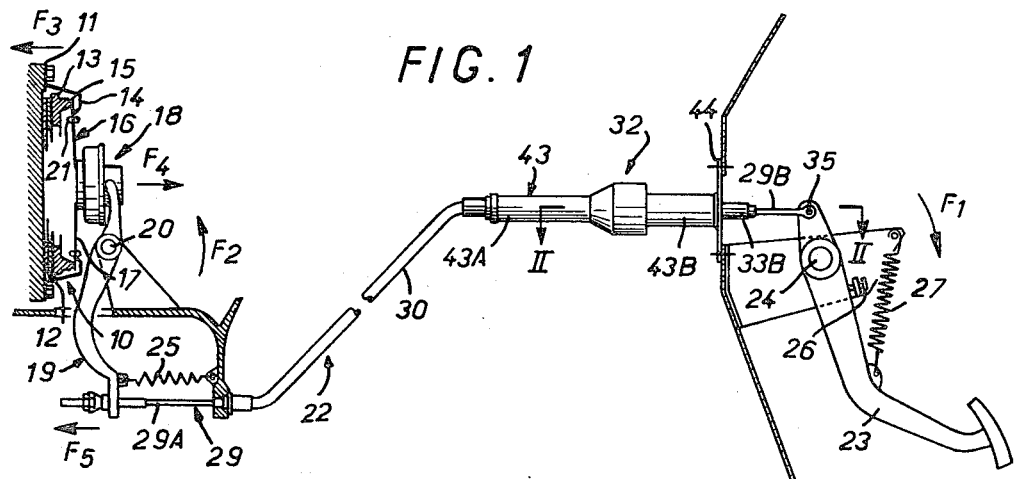
FIG. 1 shows a schematic diagram of a control linkage for a clutch, including a compensating device according to the invention.

FIG. 1 shows by way of example the application of the invention to the control of a motor vehicle clutch 10.

The clutch 10 is of conventional construction and comprises a first plate 11, or reaction plate, rigid in rotation with a drive shaft, a friction disk 12 mounted for axial movement with respect to the reaction plate 11 and rigid in rotation with a driven shaft, and a pressure plate 13 for pushing the friction plate 12 against the reaction plate 11 by the action of elastic means supported for this purpose by an annular cover 14 carried by its external periphery on the reaction plate 11.

In the example shown, the elastic means acting in this way on the pressure plate 13 consist of peripheral part 15 (forming a Belleville spring washer) of a diaphragm 16, the central part 17 of which is divided into radial fingers forming declutching means, and which is mounted for pivoting on cover 14 by appropriate connection means 21 as described, for example, in French Patent Application No. 76 03810 filed on Feb. 12th 1976.

The clutch is associated with a clutch release bearing 18 which is mounted for axial movement under the control of a declutching fork 19 which itself is mounted to pivot at a fixed point 20.

At its end opposite to the release bearing 18, the declutching fork 19 is attached to a control linkage 22 which is linked to a control pedal 23 mounted for pivotal movement about a fixed point 24.

In the example shown, the declutching fork 19 is subject to the action of a spring 25 which permanently holds the release bearing 18 in contact with the central part 17 of diaphragm 16 and, at the same time, a fixed stop 26 is associated with the control pedal 23 in order to define the rest position of the pedal; a spring 27 is attached to the pedal and pulls it permanently in the direction of this fixed stop 26.

In the embodiment shown, the control linkage 22 comprises essentially a cable 29 at least partially located in a guide and protection sheath 30, in such a way that when a pivoting force is exercised on the control pedal 23 in the direction of arrow F1 in FIG. 1, this control pedal 23 exerts a pull on the cable 29 which causes the declutching fork 19 to pivot in the direction of arrow F2 of FIG. 1, which thus causes the release bearing 18 to disengage the clutch 10.

These devices are well known by themselves and will, therefore, not be described in greater detail here.

As a consequence of the inevitable wear in service of the friction linings of the friction disk 12, the pressure plate 13 progressively approaches the reaction plate 11 in the direction of arrow F3 of FIG. 1. Due to the diaphragm 16, this results in an inverse backward movement of the clutch release bearing 18 in the direction of arrow F4 in FIG. 1.

As a consequence of this backward movement of the clutch release bearing 18, the declutching fork 19, for its part, exercises a pull on cable 29 in the direction of arrow F5 in FIG. 1.

If nothing is done, the fixed stop 26 which defines the rest position of the control pedal 23 will oppose the development of this pull and prevent the backward movement of the release bearing 18 which will lead to the appearance of play causing slippage at the friction disk 12.

Similar problems can occur if cable 29 is stretched.

In order to reduce these disadvantages provision is made to interpose a compensating device 32 into the control linkage 22.

To this end, the cable 29 forming the control linkage is divided into two successive sections 29A, 29B, the first being linked to the declutching fork 19 and the second being linked to the control pedal 23.

In a manner known in itself the compensating device 32 according to the invention comprises two coupling parts 33A, 33B which are axially telescopically movable with respect to one another and which are each respectively adapted to be linked in movement to the sections 29A, 29B of cable 29 working in conjunction with disconnectable locking means for linking the said coupling parts temporarily between them which act only in an axial direction.

In the embodiment shown, the innermost coupling part 33A forms a stem fixed on the corresponding end of section 29A of cable 29, for example by crimping, and the outermost coupling part 33B in its totality forms a tube fixed on the corresponding end of section 29B of cable 29, equally by crimping, for example, said section 29B of cable 29 being otherwise attached to pivot at the control pedal 23 by an eyelet 35.

Figure 4:
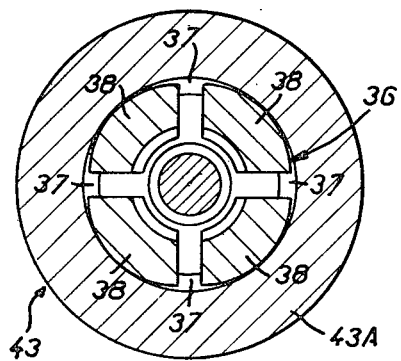
FIG. 4 shows to a different scale a transverse sectional view of the compensating device according to the invention according to line IV—IV of FIG. 2.

According to the invention, the disconnectable locking means associated with coupling parts 33A, 33B consist of a sleeve 36 which is of one piece with the outermost coupling part 33B, around the innermost coupling part 33A, and which is divided by longitudinal slits 37 into at least two jaws 38, and in the embodiment illustrated, and as can be seen best in FIG. 4, into four jaws 38.

The jaws 38 are elastically deformable between a free disengagement configuration at which (see FIGS. 2, 3, 4 and 6), they are at a distance from the innermost coupling part 33A which is parted from the outermost coupling part 33B, and an enforced engagement configuration at which, (see FIG. 5), they are gripping the innermost coupling part 33A which is united with the outermost coupling part 33B in this way.

The outside of sleeve 36 has, on the one hand, a truncated conical portion 40 working in conjunction with a fixed truncated conical portion 41 so that the jaws 38 can pass from their disengagement configuration to their engagement configuration, as described above, and, on the other hand, a cylindrical guide portion 42 following the truncated cone portion 40 in the direction of the free end of sleeve 36.

In the example shown, the fixed truncated cone portion 41 is formed on a fixed hollow body 43 in which the coupling parts 33A, 33B are located.

Moreover, the hollow body 43 is comprised of two tubular parts screwed together, i.e. a tubular part 43A gripping the guidance and protection sheath 30 of cable 29, FIG. 1, and a tubular part 43B by which it is supported on a fixed web 44, for example by welding, and which has the fixed truncated cone portion 41.

With respect to the free end of sleeve 36 the part 43A of hollow body 43 has a transverse shoulder 45 which, if necessary, can form a fixed stop for the latter.

At its end opposite to part 43A the part 43B of hollow body 43 has a hole 46 for the guidance of the coupling part 33B.

In addition, the internal hole 47 of part 43A of the hollow body 43 serves for guidance of the coupling part 33A.

In its running part the inside of part 43B of the hollow body 43 has a cylindrical portion 48 continuing from its truncated cone portion 41.

According to a characteristic of the invention the diameter $D_1$ of the cylindrical guide portion 42 of the sleeve 36 is for its enforced engagement configuration at most equal to the diameter $D_2$ of the cylindrical portion 48 of part 43B of the hollow body 43, in such a way that the said sleeve 36 is able to slide inside the said part 43B while being held by the latter in its enforced engagement configuration, (FIG. 5), as will be shown later.

Figure 3:
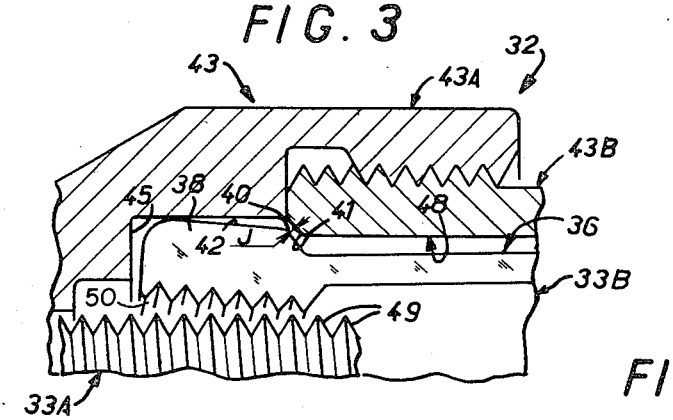
FIG. 3 shows to an enlarged scale a detail of FIG. 2 marked by an inset III in the latter.

The stem forming the coupling part 33A has teeth 49, and the jaws 38 of sleeve 36 have at their end teeth 50 which are complementary to teeth 49 of this stem, FIG. 3.

These teeth can be formed, for example, and as shown, conjointly by a helical thread.

They can also be individual teeth, which are parallel to one another and, for example, teeth with buttress thread or saw-toothed-shaped, i.e. teeth with assymmetrical profile, the flanks of which are of different cut.

The profile of these teeth can be of any desired shape.

Be that as it may, in the example shown, the innermost coupling part 33A is subject to elastic means pulling it axially.

According to the invention, these elastic means are located between a shoulder 51 of this innermost coupling part 33A and a shoulder 52 of the outermost coupling part 33B, the shoulder 51 being arranged axially beyond shoulder 52 facing said elastic means.

In practice, the toothed stem of the coupling part 33A is extended by a smooth section 54 extending axially beyond shoulder 52 of the outermost coupling part 33B and at the end of which is carried, for example by crimping, a ring 55 forming the shoulder 51, the elastic means associated with it being formed by a spring 56 arranged under preliminary tension around its smooth section 54 between shoulders 51 and 52.

Figure 2:
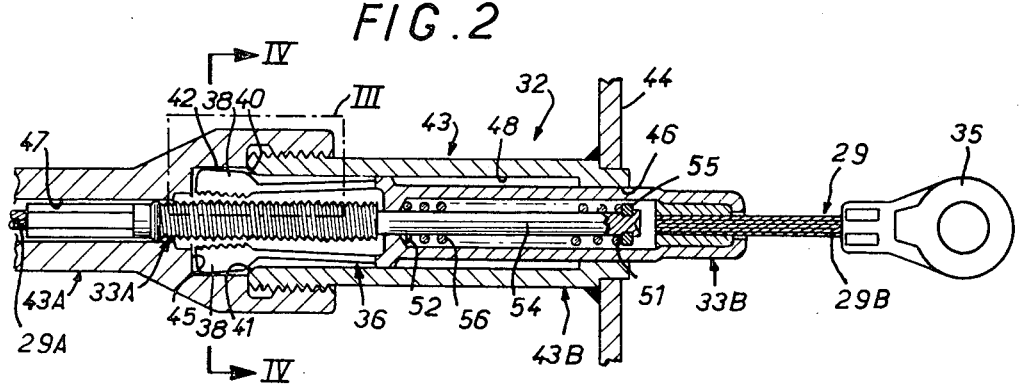
FIG. 2 shows to an enlarged scale a partial view in axial section of this compensating device taken along line II—II of FIG. 1.
Figure 6:
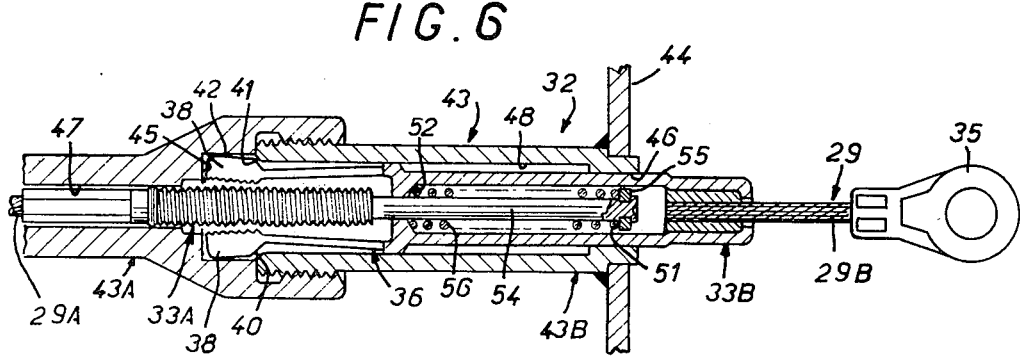

Due to this spring 56 the outermost coupling part 33B is subject to a pressure which with respect to the rest position of control pedal 23 influences the latter in the direction of a rest position for which a predetermined play J exists between the truncated cone portion 40 of sleeve 36 and the fixed truncated cone portion 41 on part 43B of the hollow body 43, (FIGS. 2,3 and 6).

At the same time, due to spring 56, the innermost coupling part 33A is subject to a pull which permanently maintains section 29A of cable 29 under tension and thus automatically takes up any stretch in the latter.

In practice, the force of spring 56 is selected to be just adequate for exercising the functions described above; in any case, it is less than that of spring 27.

When the control pedal 23 is being depressed in the direction of arrow F1 of FIG. 1 the coupling part 33B is at first the only one to be displaced, the gripping jaws 38 of sleeve 36 carried by it occupying their free disengagement configuration at rest.

Figure 5:
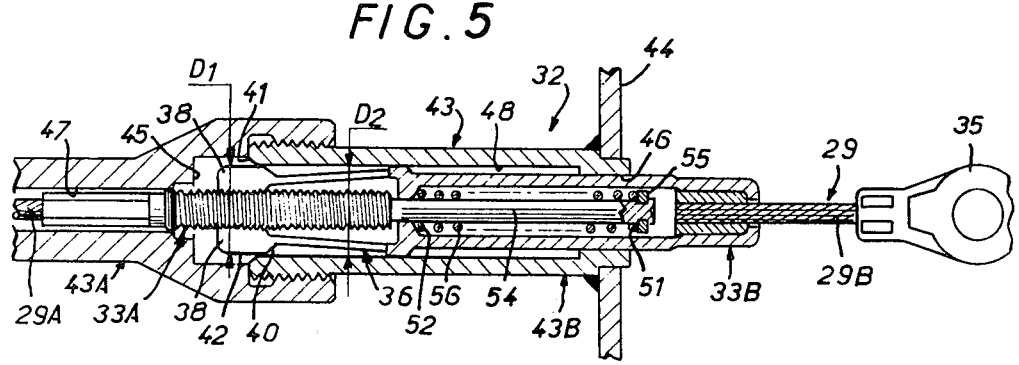
FIGS. 5 and 6 show sectional axial views analogous to that of FIG. 2 illustrating the operating mode of the compensating device according to the invention.

This situation remains like this until, after play J has been taken up, the truncated conical portion 40 of this sleeve 36 comes into contact with the fixed truncated conical portion 41, FIG. 5, and the jaws 38 of sleeve 36 are now restrained by the cam action resulting from this contact to assume their forced engagement configuration for which they are pressed onto the toothed stem of the innermost coupling part 33A.

By this, this coupling part 33A is coupled to the coupling part 33B and, while the control pedal 23 continues to be depressed, the resultant displacement of the control part 33B reflects integrally on the section 29A of cable 29 attached to the coupling part 33A, and the declutching fork 19 is driven pivotally in the direction of arrow F2 of FIG. 1; in the course of this displacement, sleeve 36 slides with gentle friction in part 43B of hollow body 43 while being kept by the latter in the enforced engagement configuration as explained above, FIG. 5.

When the control pedal 23 is no longer depressed, it is returned to its rest position by its spring 27, and spring 56 equally returns coupling part 33B to its rest position permitting jaws 38 of sleeve 36 to take up again their free disengagement by virtue of their elasticity.

At the same time spring 56 keeps section 29A of cable 29 under tension, whatever its stretch, and opposes any undesired backward movement of this cable.

However, as the wear of the friction disk 12 progresses and under the influence of spring 25 associated with the declutching fork 19, the section 29A of cable 29 progressively moves backward in the direction of arrow F5 in FIG. 1 and takes with it the innermost coupling part 33A in opposition to spring 56, FIG. 6.

So that it is easy to understand, the rest position of the outermost coupling part 33B being well defined, a play J which is necessary in joining this coupling part to the innermost coupling part 33A stays permanently constant.

Figure 7:
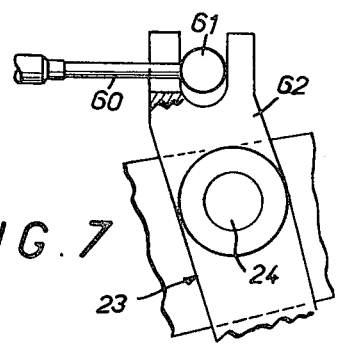
FIG. 7 shows to different scale another embodiment of the invention.

According to the variant illustrated by FIG. 7, the outermost coupling part 33B is linked with the control pedal 23 by a rigid link 60 which carries at its end a crosspiece 61 adapted to slide in a fork 62 which for this purpose forms the corresponding end of the control pedal 23.

From then on, spring 56 only serves to keep section 29A of cable 29 tight and to prevent in this manner any untimely backward movement of this cable section and to take up any stretch in it.

Figure 8:
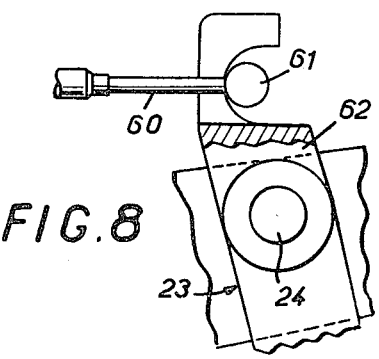
FIG. 8 shows an analogous view to that of FIG. 7, but of another variant of the invention.

In the variant of the embodiment of FIG. 8 for which the crosspiece 61 simply rests against the control pedal 23, spring 56 has a supplementary function of keeping this crosspiece 61 in contact with the pedal 23.

According to the foregoing, the rest position of the outermost coupling part 33B is defined by that of the control pedal 23, play J being adjustable from then on by action on the fixed stop 26 defining the latter.

In variation to this or at the same time, the rest position of the outermost coupling part 33B can be defined by the abutment of sleeve 36 against the shoulder 45 of part 43A of the hollow body 43.

In this case play J can be controlled, if required, by screwing or unscrewing part 43A of the hollow body 43 with shoulder 45 for adjusting the latter axially with respect to part 43B with which it is associated.

The present invention is not limited to the embodiments described and shown, but encompasses all design variants within the scope of the claims.

In particular, the hollow body 43 can, for example, be implemented with the aid of two shells which in their totality are semicylindrical.

In addition, the application of the invention is not limited to the case where the transmission linkage concerned essentially consists of a cable for transmitting a movement by pull.

On the contrary, it extends to the case where this linkage consists of a rigid linkage for transmitting a movement both by push or by pull.

In this case the respective arrangements of the truncated cone portions of the sleeve divided into gripping jaws by slits and of the fixed truncated cone portion associated with it are transposed.

Furthermore, the invention is not limited to the case where the clutch 10 is a diaphragm type but extends, for example, to the case where the declutching means are levers.

Moreover, the springs associated with the declutching fork 19 and the control pedal 23 can be torsion springs.

Finally, if in the above the release bearing 18 acts by an axial push on the disconnecting means of clutch 10 it can also act on them by axial pull by appropriate arrangement of the pivot 20 of the declutching fork 19.

I claim:

1. A compensating device for a control linkage adapted to be arranged between two sections of said control linkage, said compensating device comprising inner and outer coupling parts having means for connection respective to first and a second linkage sections; spring means operatively connected to said inner coupling part for urging a first linkage section in a first direction to overcome its tendency in the course of use to be displaced in the opposite direction; coupling means for temporarily coupling said inner and outer coupling parts together for axial movement in one direction, said coupling means including an axial sleeve on said outer coupling part having integral resilient jaws with longitudinal slits therebetween and cooperating means on said inner coupling part couplingly engageable with said resilient jaws, said sleeve having a free end, said resilient jaws being on the free end of said axial sleeve and being normally self biased out of engagement with said cooperable means on said inner coupling part; and frustoconical portions on said jaws normally spaced from and engageable with relatively fixed frustoconical portions for automatically camming said jaws into interlocking engagement with said inner coupling part during the initial part of operating displacement of the associated control linkage in said one direction.

2. The compensating device according to claim 1, wherein said spring means is arranged between a shoulder formed on said inner coupling part and a shoulder formed on said outer coupling part.

3. The compensating device according to claim 2, wherein said shoulder on said inner coupling part is arranged axially beyond said shoulder on said outer coupling part relative to a first linkage section.

4. A compensating device according to claim 1, wherein said inner coupling part comprises a stem and said cooperable means thereon comprise teeth, and wherein said jaws have teeth cooperable with said teeth of said cooperable means.

5. The compensating device according to claim 4, wherein said teeth on said inner coupling part are defined by a helical thread.

6. The compensating device according to claim 4, wherein said teeth on said inner coupling part have flanks respectively parallel to one another.

7. The compensating device according to claim 4, wherein said teeth on said inner coupling part have assymetrical profiles.

8. The compensating device according to claim 1, wherein said fixed frustoconical portion is formed on a fixed hollow body accommodating said coupling parts.

9. The compensating device according to claim 8, wherein the hollow body comprises two connected tubular parts, means on at least one of said tubular parts for axially adjusting said tubular parts relative to each other.

10. The compensating device according to claim 8, wherein guide portions are provided on said jaws for maintaining said jaws in contact with aid cooperable means during displacement in a fixed cylindrical portion, the diameter of said guide portions when said jaws are in coupling engagement with said cooperating means on said inner coupling part being at most equal to that of said fixed cylinder portion.

11. A compensating device according to claim 10, said cylindrical portion being formed on the inside of said hollow body.

12. The compensating device according to claim 8, wherein said hollow body has a transverse shoulder for defining a rest position of said outer coupling, in a direction opposite said one direction.

13. The compensating device according to claim 12, wherein a recess in said hollow body accommodates said jaws in their normally disengaged position, said transverse shoulder defining a wall portion of said recess.

14. A self adjusting cable length compensating device comprising a hollow housing defining an axially elongated space having an enlarged cross-section at one end of said space, an inner coupling part entering into said space at said one end, an outer coupling part being at least in part telescoped over said inner coupling part, said coupling parts in the normal operation of said cable being movable through said space away from said one end, resilient means reacting between said coupling parts urging increased telescoping of said coupling parts, including movement of said inner coupling part axially away from said one end and cooperating means on said coupling parts for effecting interlocking of said coupling parts for movement in unison, said cooperating means including at least two jaws on said outer coupling part spaced around said inner coupling part, said outer coupling part being free to move to a normal position in said space one end at which normal position said jaws are free to outwardly expand into said enlarged portion of said generally cylindrical space to release said inner coupling part and to permit said inner coupling part to self adjust relative to said outer coupling part both under the influence of said resilient means and any adjusting means opposing said resilient means.

15. A self adjusting device according to claim 14, wherein said housing defines a transverse shoulder at said one end for engagement by said outer coupling part to limit axial movement of said outer coupling part towards said one end.

16. A self adjusting device according to claim 14, wherein said jaws are integral with the remainder of said outer coupling part and are configurated to normally assume positions released from said inner coupling part.

17. A self adjusting device according to claim 14, wherein said space except for said portion of enlarged cross-section being of a cross-section to engage said jaws and return said jaws interlocked with said inner coupling parts.

18. A self adjusting device according to claim 14, wherein said inner coupling part has an extension beyond said cooperating means remote from said housing one end, said outer coupling part has a sleeve portion telescoped over said extension, and said resilient means being in the form of a coil spring telescoped over said extension within said sleeve portion.

* * * * *